(12) United States Patent
Florian

(10) Patent No.: US 6,508,581 B2
(45) Date of Patent: Jan. 21, 2003

(54) EXTRUSION APPARATUS WITH ROTATABLE WINDING SOCKET

(75) Inventor: Fischer Florian, Ebersberg (DE)

(73) Assignee: A-Z Formen- und Maschinenbau GmbH (DE)

( * ) Notice: Subject to any disclaimer, the term of this patent is extended or adjusted under 35 U.S.C. 154(b) by 3 days.

(21) Appl. No.: 09/733,535

(22) Filed: Dec. 8, 2000

(65) Prior Publication Data

US 2001/0038571 A1 Nov. 8, 2001

(30) Foreign Application Priority Data

Dec. 8, 1999 (DE) .......................... 199 59 174

(51) Int. Cl.[7] ................................. B29B 7/60
(52) U.S. Cl. ....................... 366/76.1; 366/83
(58) Field of Search ................. 366/76.1–76.4, 366/76.6, 76.93, 79–81, 83–85, 88–91, 293–296, 318, 321, 323; 425/582, 585, 586

(56) References Cited

U.S. PATENT DOCUMENTS

| 2,947,030 | A | * | 8/1960 | Varn |
| 3,409,711 | A | * | 11/1968 | Pashak |
| 3,453,356 | A | * | 7/1969 | Kent, Jr. et al. |
| 3,481,001 | A | * | 12/1969 | Stillhard |
| 4,405,399 | A | * | 9/1983 | Gibbons |
| 4,600,375 | A | * | 7/1986 | Honsho et al. |
| 4,848,915 | A | * | 7/1989 | Fintel |
| 5,110,275 | A | * | 5/1992 | Scheuring |
| 5,259,749 | A | * | 11/1993 | Meixner et al. |
| 5,358,680 | A | * | 10/1994 | Boissonnat et al. |
| 5,577,839 | A | * | 11/1996 | Brams et al. |
| 5,925,295 | A | * | 7/1999 | Nakamura et al. |
| 6,186,769 | B1 | * | 2/2001 | Hawley |
| 6,238,733 | B1 | * | 5/2001 | Therolf |
| 6,364,518 | B1 | * | 4/2002 | Gleich et al. |

FOREIGN PATENT DOCUMENTS

| DE | 31 33 708 C2 | 7/1983 |
| DE | 40 05 400 C1 | 9/1991 |

* cited by examiner

Primary Examiner—Charles E. Cooley
(74) Attorney, Agent, or Firm—R W Becker & Associates; R W Becker

(57) ABSTRACT

An extrusion apparatus is provided having an extrusion worm with a threaded exterior passage and rotatably driven by a drive shaft operatively couplable with a drive motor for driving rotation of the drive shaft. A feed in device for feeding in strip form material which is to be extruded is disposed relative to the rotational axis such that the material strips fed in by the feed in device are advanced substantially parallel to the rotational axis during rotation of the drive shaft and the extrusion worm.

28 Claims, 1 Drawing Sheet

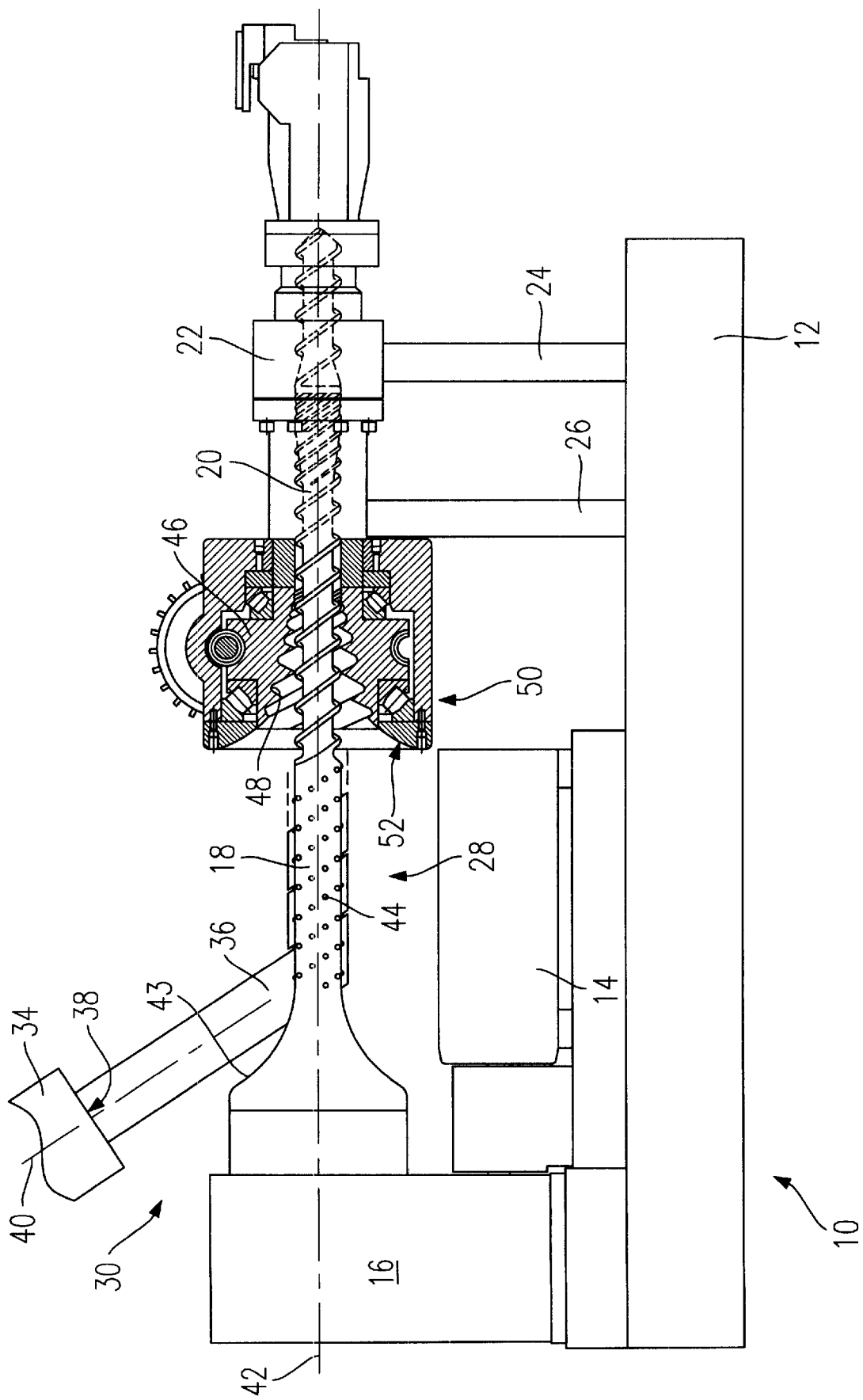

EXTRUSION APPARATUS WITH ROTATABLE WINDING SOCKET

BACKGROUND OF THE INVENTION

The present invention relates to an extrusion apparatus and a method for extrusion.

Extrusion apparatus serve in the feed of material, especially plastics, whereby the extrusion apparatus is typically heated and the material that is fed in in granular or strip form is plasticized in the course of the extrusion process. In connection with the feeding in of material to be plasticized in strip form, it must be ensured that the extrusion worm is continuously supplied with sufficient material feedstock as otherwise an insufficient material feedstock leads inevitably to the inclusion of air which, depending upon the intended use of the respective extruded material, is not acceptable. In order to control the feeding in of the material feedstock, the material strip or granules are frequently fed from above to a horizontally extending worm. An example of this solution is disclosed in DE-OS 31 33 708. In this disclosed extrusion apparatus, the variations in the performance of the extrusion apparatus should be countered by a special storage zone of the extrusion worm.

A disadvantage of the noted solution is that a mixing occurs only on one side of a location, whereby in this respect the extrusion worm is radially loaded on one side. This condition can also result in a bending of the extrusion worm that, in turn, leads to a metal-on-metal rubbing of the side of the extrusion worm opposite to the radially loaded side, with the attendant disadvantages.

Research has shown that the quality of the feed is decisive for the performance of an extruder. Accordingly, efforts have been made to ensure the best possible synchronization between the feed rollers of the strip feed device and the drive of the extrusion worm. Nonetheless, there occurs in many instances involving a substantially radial feed a non-uniform degree of filling of the extrusion worm passage as a result of which it has been proposed to simultaneously fill several worm passages whenever possible. A solution of this manner is disclosed, for example, in DE-PS 40 05 400 in which it is endeavored to constantly maintain a blockage roll.

The just noted solution basically presents, in fact, an interesting approach. On the other hand, the material, before its actual plasticizing, is subjected to a decidedly strong shearing force that can be detrimental to the material properties.

SUMMARY OF THE INVENTION

The present invention accordingly provides a solution to the challenge of providing an extrusion apparatus that, in view of its total performance, is improved without necessitating especially burdensome measures with regard to controlling the feed of the material to be extruded.

In accordance with the present invention, the axial feed of material strips to the extruder permits the possibility of avoiding a one-sided radial pressure on the extrusion worm. Additionally, the extrusion worm is filled with feed material around its entire periphery, which provides the particular advantage of reducing the probability that air, which can degrade the quality of the extrudate, will be introduced in this area of the extrusion process.

The material strips can be fed at an angle onto the shaft between the drive motor and the extrusion worm and can be engaged by the shaft for drawing along by the shaft. In this regard, it is sufficient if the material strips are disposed at an angle in a hanging manner toward the shaft such that the engagement or take-up element of the shaft can, at the least, engage the material strips by frictional engagement.

In connection with this solution of the present invention, attention must be paid that a continuous feed to the extrusion worm is ensured. If the engagement or take-up element of the shaft is configured, for example, with a type of hook, the material strips can be manually hooked on at their leading ends. Thereafter, the engagement or take-up element in the form of hooks automatically draw the material strips at the proper speed and, thus, the corresponding proper feed volume for the extrusion worm and this is demonstrated in that the material fully encircles the extrusion worm in the transition area—namely, the beginning of the extrusion worm. A particular advantage is realized in this connection in that the necessity of a partial back or counter flow, which brings with it the associated problem of shear loading of the material, can be completely avoided. The uniformity that is sought by use of a blockage roll automatically results in that a uniform condition of the feed material exists around the entire periphery of the extrusion worm.

In an advantageous embodiment of the present invention, it is provided that the material strips, instead of being wound in a plurality of windings about the shaft, are fed to the shaft in the manner of a pipe made of a continuous winding which has been axially extended out of its wound shape. This solution is particularly advantageous if a winding socket is rotated counter to the rotation of the extrusion worm and thereby ensures the required uniformity of the fed in material. In this solution, the material strips extend in the area of the shaft over approximately three-fourths of the circumference of the shaft, whereupon the desired distribution of the material is accomplished via the rotation and the counter-rotation.

It is particularly advantageous if the improved chamber filling of the extrusion worm leads to an improvement of about one-fifth in the output.

In accordance with a particularly advantageous embodiment of the present invention, it is provided that the transition area is configured between the shaft and the extrusion worm at the front end of the extruder housing and that the extruder housing at this location is configured with a widening or enlargement such that, as viewed in the direction of flow of the material, the transition area reduces or tapers conically. In this solution, a material strip hanging down to the shaft at an angle is simultaneously automatically engaged by the shaft and worked by the extrusion worm.

It is to be understood that the angle at which the material is fed into the feed zone can be selected to satisfy a wide range of requirements. For example, the material strips feeder, which comprises suitable feed rollers for the material strips, can be configured such that the angle of its output axis is oriented at an angle, for example, of 30° relative to the shaft, whereby the intersection point between the output axis and the shaft is thus desirably immediately behind the beginning of the shaft—namely, adjacent the drive motor. The material strips are then directionally re-oriented upon engagement by the shaft and, in fact, re-oriented into an axis parallel direction such that the material extends parallel to the axis of the shaft upon reaching the transition area.

Further advantages, details, and features are set forth in the following description of one exemplary embodiment of the present invention together with the one FIGURE of the drawing.

BRIEF DESCRIPTION OF THE DRAWING

The one FIGURE of the drawing is a schematic side view of one embodiment of the extrusion apparatus of the present invention.

DETAILED DESCRIPTION OF THE PREFERRED EMBODIMENTS

The sole FIGURE of the drawing shows one embodiment of an extrusion apparatus 10 of the present invention. The extrusion apparatus 10 includes an apparatus base 12 on which a drive motor 14 is supported. The drive motor 14 is disposed on the flank of a drive device 16 from which a drive shaft 18 extends. The drive shaft 18 extends transversely over the apparatus base 12 and transitions into an extrusion worm 20.

The extrusion worm 20 extends into an extruder housing 22 that is supported on the apparatus base 12 via brackets 24, 26.

The drive shaft 18 extends over a considerable area—namely, the feed in area 28 bounded by the drive motor 16 and the extruder housing 22. The feed in area 28 forms a portion of an axial conveying or feed advancing device 30 with which is associated a material strip supplier 34, as is schematically shown in the sole FIGURE of the drawing. The material strip supplier 34 continuously supplies a material strip 36 comprised of polymeric material and, in particular, of an elastomer, to the feed in area 28 of the drive shaft 18. The material strip supplier 34 comprises suitable feed rollers. The material strips 36 exit the material strip supplier 34 at its outlet 38 along an axis 40. This axis extends at an angle to the axis 42 of the drive shaft 18 and, in fact, is arranged such that the material strips 36 are advanced in the direction of the extrusion worm upon exiting the outlet 38.

It is preferred if the material strip supplier 34 is mounted adjacent the drive means or device 16 so that the material strips 36 are fed over a considerable extent above the free feed in area 28 of the drive shaft 18. In this manner, a movement parallel to the axis 42 of the drive shaft 18 is set up.

The drive shaft 18 includes a concave rounded or radiused portion 43 on its drive motor adjacent area, and a plurality of engagement or take in elements 44 distributed along the entire extent of the drive shaft in the feed in area 28, the engagement elements 44 being adapted for engaging the material strips 36. In the illustrated embodiment, the engagement elements 44 are configured as small pegs whose pointed tips extend into the material strips 36 and prevent a slipping of the material strips being fed. Alternatively, it is also possible to provide the drive shaft 18 with an appropriately roughened top surface or with uniformly spaced hooks that can already grip a material strip in a sidewise manner if it hangs under into the area of the shaft. This solution provides a particular advantage in that the material strips can be fed to the extruder without manual intervention.

In the illustrated embodiment, the engagement elements 44 are configured as thorns that are arranged in a spiral manner around the outer periphery of the drive shaft 18. In a modification of the extrusion apparatus, it is provided that a counter rotating press roller be located at the intersection location of the material strips 36 on the drive shaft 18. The material strips that are hanging down are fed in a self-actuating manner into the space between the press roller and the drive shaft 18. It is at that location that the material strip is engaged by the engagement elements 44 in a manner such that the material strip also remains on the drive shaft 18 upon further rotation of the drive shaft. The material strip is moved with a predetermined speed upon further rotation of the drive shaft in that the material strip remains rolled onto the drive shaft 18 until reaching the extruder housing 22, whereupon the material is then engaged in the area of the extrusion worm 20.

While with conventional extrusion apparatus special measures must be undertaken for the synchronization between the feeding in of the material and the extrusion worm, this synchronization is effectively automatically accomplished by the extrusion apparatus of the present invention by virtue of the fixed connection of the drive shaft 18 and the extrusion worm 20. Once the first winding of fed in material on the drive shaft 18 has been effected, the drive shaft can then draw the next following material in the required amount, whereby the possibility comes into play of controlling the material strip supplier 34 via a tension sensor which measures the tension of the material strips 36.

In an especially advantageous embodiment of the present invention, a winding socket 46 is provided at the material intake side of the extruder housing 22. The winding socket 46 includes an inner threaded portion 48 and is rotatable such that the inner threaded portion 48 rotates counter to the rotation of the extrusion worm 20. In this manner, the fixed or half-fixed material of the material strips 36 is, in the transition region 50, subjected to a counter movement such that a uniform annular distribution of the material around the extrusion worm is enhanced; in this connection, an intake taper 52 is provided at the intake side of the extrusion worm. This solution is of particular importance if the material strips are fed via an axis parallel push movement in the area of the drive shaft 18—in other words, fed without winding about the shaft. A material strip that has been fed in this push movement manner typically does not completely encircle the drive shaft 18; instead, the material strip only encircles, for example, up to three-fourths of the drive shaft. By virtue of the counter rotating inner threaded portion 48, it is then in conjunction with the uniform application of the fed in material also ensured that no partial counter flow or a blockage roll occurs on the outer periphery of the material strips that are to be classified.

It is to be understood that, in accordance with the present invention, it is also further possible without the need for modification to feed in several material strips parallel to one another, if the extrusion apparatus 10 is also to operate as a mixing apparatus. For example, several material strip suppliers 34 can be arranged serially relative to one another at staggered heights or at the same axial height while nonetheless angularly offset from one another.

While the drive shaft 18 and the extrusion worm 20 described in connection with the illustrated embodiment of the present invention are configured as a single integrally formed component, it is also possible to configure these two elements as separable in the transition region so as to facilitate, for example, an easy removal of the extrusion worm 20 from the extruder housing 22 for cleaning purposes.

The specification incorporates by reference the disclosure of German priority document 199 59 174.1 of Dec. 8, 1999.

The present invention is, of course, in no way restricted to the specific disclosure of the specification and drawings, but also encompasses any modifications within the scope of the appended claims.

What I claim is:

1. An extrusion apparatus comprising:
   an extrusion worm having a threaded exterior for advancing material therealong upon rotation of the extrusion worm, the extrusion worm being connected to a drive shaft which is operatively couplable with a drive motor for driving rotation of the drive shaft and the extrusion worm about a rotational axis;
   a feed in device for feeding in strip form material which is to be extruded, the feed in device being disposed relative to the rotation axis such that the material strips fed in by the feed in device are advanced substantially parallel to the rotational axis during rotation of the drive shaft and the extrusion worm, and means encircling at least the extrusion worm in a transition region at which the material strips leave the drive shaft and are received onto the extrusion worm, the encircling means and the extrusion worm forming a space therebetween which reduces in size in the direction of advancement of material.

2. An extrusion apparatus according to claim 1, wherein the feed in device includes means for feeding material strips at an angle to the rotational axis in a manner such that the material strips are wound about at least one of the drive shaft and the extrusion worm and are advanced by rotation of the extrusion worm.

3. An extrusion apparatus according to claim 1, wherein the extrusion apparatus is operable to advance the material strips around substantially the full periphery of the drive shaft.

4. An extrusion apparatus according to claim 1, wherein the extrusion apparatus is operable to advance the material strips around substantially the full periphery of the drive shaft in a transition region at which the material is advanced from the drive shaft to the extrusion worm in an advancement manner such that the possibility of a partial counter flow is reduced.

5. An extrusion apparatus according to claim 1, wherein the extrusion apparatus is operable to handle material strips having a width which is 5% to 200% of the diameter of the drive shaft, 30% to 150% of the diameter of the drive shaft, or approximately the diameter of the drive shaft.

6. An extrusion apparatus according to claim 1, wherein the extrusion apparatus is operable to handle material strips having a smooth surface and having a width that is greater than half the diameter of the drive shaft, or both greater than half the diameter of the drive shaft and somewhat less than the circumference of the drive shaft.

7. An extrusion apparatus according to claim 1, wherein the feed in device includes a material strip supplier operable to feed a material strip along an axis and having an outlet at which a material strip exits the material strip supplier, the outlet of the material strip supplier being spaced above the drive shaft and the material strip supplier being operable to feed a material strip onto the drive shaft from an orientation in which the material strip hangs in a flexible disposition in the direction of the drive shaft.

8. An extrusion apparatus according to claim 1, wherein the drive shaft has a material strip receiving longitudinal extent that is at least twice the diameter of the extrusion worm.

9. An extrusion apparatus according to claim 1, wherein the end of the drive shaft couplable to a drive motor includes an enlargement having a concave profile.

10. An extrusion apparatus according to claim 1, wherein the drive shaft has an outer diameter that is substantially the same as the outer diameter of the extrusion worm.

11. An extrusion apparatus according to claim 1, wherein the drive shaft includes a plurality of engagement elements operable to engage a material strip and maintain engagement with the material strip as the drive shaft rotates such that the material strip is drawn onto the drive shaft.

12. An extrusion apparatus according to claim 1, wherein the drive shaft is operable to advance the material strips to the extrusion worm in a manner in which the material strips substantially fully encircle the drive shaft upon being advanced into a transition region at which the material strips leave the drive shaft and are received onto the extrusion worm.

13. An extrusion apparatus according to claim 1, wherein the space formed between the encircling means and the extrusion worm is annular and the encircling means includes an intake taper.

14. An extrusion apparatus according to claim 1, and further comprising a housing enclosing the drive shaft and the extrusion worm and wherein the drive shaft and the extrusion worm are configured without break lines as a single unit and a selected one of the housing and the assembly of the drive shaft, the extrusion worm, and the drive motor are configured for disassembly for permitting access to the extrusion apparatus for maintenance purposes.

15. An extrusion apparatus comprising:

an extrusion worm having a threaded exterior for advancing material therealong upon rotation of the extrusion worm, the extrusion worm being connected to a drive shaft which is operatively couplable with a drive motor for driving rotation of the drive shaft and the extrusion worm about a rotational axis;

a feed in device for feeding in strip form material which is to be extruded, the feed in device being disposed relative to the rotation axis such that the material strips fed in by the feed in device are advanced substantially parallel to the rotational axis during rotation of the drive shaft and the extrusion worm, wherein the material strips are advanced along a drive shaft exit and are received onto the extrusion worm at a transition region, and a socket having an inner threaded portion encircling the transition region, the socket being rotatable at a rate of rotation different than the rate of rotation of the extrusion worm.

16. An extrusion apparatus according to claim 15, wherein the socket rotates counter to the rotation of the extrusion worm and the diameter of the inner threaded portion of the socket reduces in the direction of the advancement of material.

17. An extrusion apparatus according to claim 15, wherein the feed in device includes means for feeding material strips at an angle to the rotational axis in a manner such that the material strips are wound about at least one of the drive shaft and the extrusion worm and are advanced by rotation of the extrusion worm.

18. An extrusion apparatus according to claim 15, wherein the extrusion apparatus is operable to advance the material strips around substantially the full periphery of the drive shaft.

19. An extrusion apparatus according to claim 15, wherein the extrusion apparatus is operable to advance the material strips around substantially the full periphery of the drive shaft in a transition region at which the material is advanced from the drive shaft to the extrusion worm in an advancement manner such that the possibility of a partial counter flow is reduced.

20. An extrusion apparatus according to claim 15, wherein the extrusion apparatus is operable to handle material strips having a width which is 5% to 200% of the diameter of the drive shaft, 30% to 150% of the diameter of the drive shaft, or approximately the diameter of the drive shaft.

21. An extrusion apparatus according to claim 15, wherein the extrusion apparatus is operable to handle material strips having a smooth surface and having a width that is greater than half the diameter of the drive shaft, or both greater than half the diameter of the drive shaft and somewhat less than the circumference of the drive shaft.

22. An extrusion apparatus according to claim 15, wherein the feed in device includes a material strip supplier operable to feed a material strip along an axis and having an outlet at which a material strip exits the material strip supplier, the outlet of the material strip supplier being spaced above the drive shaft and the material strip supplier being operable to feed a material strip onto the drive shaft from an orientation in which the material strip hangs in a flexible disposition in the direction of the drive shaft.

23. An extrusion apparatus according to claim 15, wherein the drive shaft has a material strip receiving longitudinal extent that is at least twice the diameter of the extrusion worm.

24. An extrusion apparatus according to claim 15, wherein the end of the drive shaft couplable to a drive motor includes an enlargement having a concave profile.

25. An extrusion apparatus according to claim 15, wherein the drive shaft has an outer diameter that is substantially the same as the outer diameter of the extrusion worm.

26. An extrusion apparatus according to claim 15, wherein the drive shaft includes a plurality of engagement elements operable to engage a material strip and maintain engagement with the material strip as the drive shaft rotates such that the material strip is drawn onto the drive shaft.

27. An extrusion apparatus according to claim 15, wherein the drive shaft is operable to advance the material strips to the extrusion worm in a manner in which the material strips substantially fully encircle the drive shaft upon being advanced into a transition region at which the material strips leave the drive shaft and are received onto the extrusion worm.

28. An extrusion apparatus according to claim 15, and further comprising a housing enclosing the drive shaft and the extrusion worm and wherein the drive shaft and the extrusion worm are configured without break lines as a single unit and a selected one of the housing and the assembly of the drive shaft, the extrusion worm, and the drive motor are configured for disassembly for permitting access to the extrusion apparatus for maintenance purposes.

* * * * *